United States Patent

Battigelli

[15] 3,649,232
[45] Mar. 14, 1972

[54] METHOD AND APPARATUS FOR PRODUCTION OF FIBERS FROM THERMOPLASTIC MATERIALS, PARTICULARLY GLASS FIBERS

[72] Inventor: Jean Battigelli, Rantigny (Oise), France
[73] Assignee: Compagnie de Saint-Gobain, Neuilly-sur-Seine, France
[22] Filed: Mar. 12, 1969
[21] Appl. No.: 806,564

[30] Foreign Application Priority Data

Mar. 14, 1968 France....................................143718
July 10, 1968 France....................................158651

[52] U.S. Cl...................................65/6, 18/2.5 RR, 18/2.6, 65/14, 264/8, 264/12, 264/164
[51] Int. Cl..........................................C03b 37/04
[58] Field of Search....................264/12, 8, 164; 18/2.5 RR, 18/2.6, 85 R; 65/6, 7, 8, 14, 15

[56] References Cited

UNITED STATES PATENTS

3,060,498  10/1962  Rubissow...............................18/2.6 X
3,238,029  3/1966   Cullen....................................18/2.6 UX
3,246,971  4/1966   Rudin............................................65/6
3,336,125  8/1967   Schachter..................................65/6 X Primary Examiner—S. Leon Bashore
Assistant Examiner—Robert L. Lindsay, Jr.
Attorney—Dale A. Bauer, John L. Seymour, Bauer and Seymour and Samuel Lebowitz

[57] ABSTRACT

The production of fibers from thermoplastic materials, particularly glass fibers, by projecting or applying a layer of the material from one or more streams in a viscous state, onto the external surface of a rapidly moving or rotating body, which is provided with priming points for starting the emission for individual fibers from the layer of the material by centrifugal force, until the fibers are in condition to be subjected to attenuating forces produced mechanically or by attenuating gaseous blasts. The priming points for the fibers may be provided mechanically by roughenings, ridges, snagging or hooking points, etc.; thermally by forming a plurality of points of different heat gradients; or pneumatically by forming orifices in the external wall of the moving body, through which gas under pressure is blown to start the formation of the filaments from the layer of viscous material.

29 Claims, 40 Drawing Figures

PATENTED MAR 14 1972 3,649,232

METHOD AND APPARATUS FOR PRODUCTION OF FIBERS FROM THERMOPLASTIC MATERIALS, PARTICULARLY GLASS FIBERS

The present invention relates to the manufacture of fibers from mineral or organic materials in the viscous state, and in particular to the production of glass fibers from vitreous materials.

It is the object of the invention to produce fibers by feeding the material to be transformed into a fibrous state, onto the outer lateral wall of a moving body, especially onto a portion of the periphery of a revolving body, rotating at high speed, said material being renewed in continuous fashion and carried along by said wall for ultimate detachment therefrom by the action of centrifugal force, while forming a large number of filaments, and in transforming the resultant filaments into fibers by means of a jet or blast of gaseous fluid.

The moving body may be constituted by an endless band, the radius of curvature of which may be variable. According to another characteristic of the invention, the jet of gaseous fluid for drawing out or attenuating the threads into fibers, surrounds the moving body in the zone where the material is subjected to the centrifugal force.

According to another characteristic of the invention, the deposit of the thermoplastic material onto the outer wall of the moving body is effected by projecting a jet or stream of this material onto this wall. This deposit of material may be attained by a single jet or by means of several jets distributed around the outer wall of the moving body.

Furthermore, according to another characteristic of the invention, the deposit of the thermoplastic material for transformation to fibrous form is effected by permitting a streamlet of the material to fall on a rotating disc, which in turn projects the material onto the outer wall of the moving body. The jet of thermoplastic material which is projected onto the outer wall of the moving body may be localized to obtain an impact of the jet at the desired spot of said wall. Also, an oscillating movement may be imparted to this jet to sweep across the wall.

According to another characteristic of the invention, the deposit of the thermoplastic material may be effected by a gaseous jet acting on a streamlet of said material to project the streamlet onto the wall. This jet may be oscillated to sweep the wall. In accordance with still another characteristic of the invention, the deposit of material is attained by permitting a streamlet of the material to fall onto a vibrating member which directs the streamlet onto the wall.

The invention also contemplates the deposit of material onto the outer wall of the movable body by means of the material supplied to a reservoir contiguous to said wall, and which is supplied continuously.

According to another characteristic of the invention, the filaments proceeding from one moving body are recovered by a second moving body, having its axis parallel to the first, and an annular jet of fluid effects a new attenuation of the fibers thus recovered and projected by this second moving body.

According to another characteristic of the invention, the gaseous jet acting on the filaments projected by the moving body is produced by burners whose combustion chamber is provided with a continuous orifice or a succession of orifices from which the gas escapes. A suitable temperature is imparted to these gases so that the viscosity of the material on the lateral wall of the moving body is sufficiently low to enable said material to be projected in the form of threads.

In order to cool the inner surface of the lateral wall of the moving body, a fluid, such as air or steam, may be circulated into contact therewith.

It is advantageous, according to another characteristic of the invention, to heat the outer lateral wall of the moving body, particularly by induction heating.

According to another characteristic of the invention, hot points may be formed on the external wall of the moving body, particularly a rotating body, these serving as priming or starting points for the filaments for ejection from said wall.

It is another object of the invention to provide the snagging or priming points for the filaments of the viscous material by means of perforations in the lateral wall of the moving body, through which is exerted an overpressure.

In accordance with one mode of execution, the overpressure is attained at the interior of an enclosure provided inside the moving body, which is defined by the inner part of its peripheral wall. This enclosure or chamber may comprise all or part of the interior space of the moving body; in particular it may be annular, with its inner wall substantially parallel to the peripheral wall of the body in rotary motion.

In accordance with another embodiment of the invention, there is arranged on the interior of the moving body one or several stages or rows of blowers disposed opposite the internal face of the perforated peripheral wall and affecting the entire height of the latter. These stages are preferably supplied with a hot fluid under pressure. The invention contemplates that the gaseous currents be directed particularly along lines perpendicular to the surface of the wall, that is, substantially along the axes of the perforations.

Other objects and purposes will appear from the detailed description of the invention following hereinafter, taken in conjunction with the accompanying drawings, wherein.

Figures 1, 2:
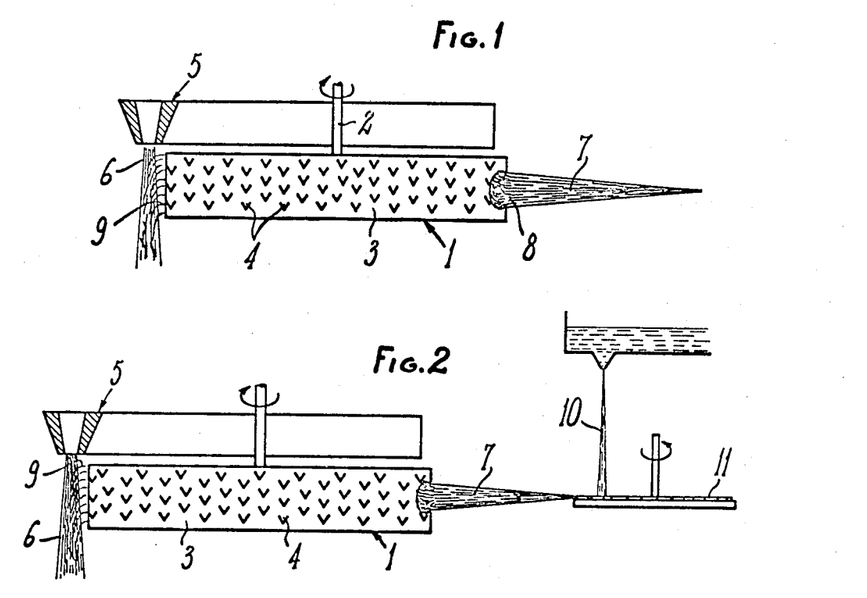
FIG. 1 is a front elevation of one embodiment of the invention.
FIG. 2 is a front elevation of a device similar to that shown in FIG. 1, with an arrangement for supplying the viscous thermoplastic material thereto.
Figure 3:
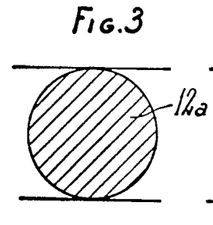
FIGS. 3 to 6 are sectional views illustrating different outlines of impact of the jet of viscous material on the wall of the rotating body.
Figure 4:
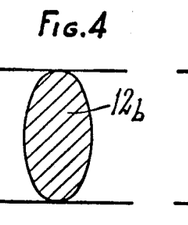
Figure 5:
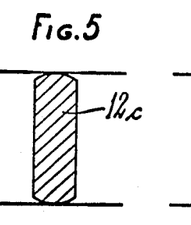
Figure 6:
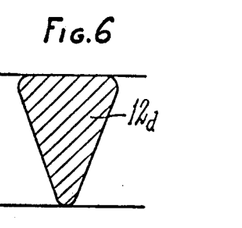

FIG. 1 illustrates schematically an apparatus for executing the method in accordance with the invention. This device comprises a rotary body 1 in the form of a solid revolution rotating at high velocity around its axis 2. The peripheral wall 3 of this body comprises roughened places or snag points, described in greater detail below. The device also comprises an annular crown concentric with the axis 2 and from which is discharged a jet of fluid 6 at high velocity.

The material to be fiberized is projected in the form of a jet 7 onto wall 3, there to constitute a reserve of material 8 from which are projected the filaments 9 as a result of the centrifugal action of body 1. These filaments are subjected to the action of the jet of fluid 6 which attenuates and draws them out and transforms them into fibers.

The supply of material to be fiberized may be effected by the projection of a thread or streamlet 10 which is diverted from a vertical direction to the horizontal direction of jet 7 by means of the accelerator disc 11 rotating about a vertical axis.

The speed of jet 7 which is projected onto wall 3 must be such, taking into account the rate of flow, that the material to be fiberized completely moistens said wall. Besides, the surface of impact of the jet with the wall should have a well defined outline so that distribution of the material on the wall may be controlled.

Figure 8:
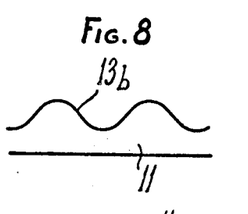
Figure 9:
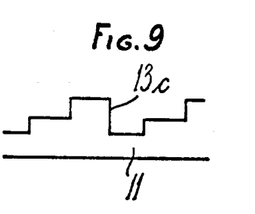

The outline of the jet of thermoplastic material on impact with the wall may have, for example, one of the shapes 12a, 12b, 12c, 12d shown in FIGS. 3 to 6, respectively. These shapes may be obtained by means of appropriate sections 13a, 13b, 13c, imparted on the surface of the accelerator disc 11 shown in FIGS. 7 to 9, respectively.

Figure 7:
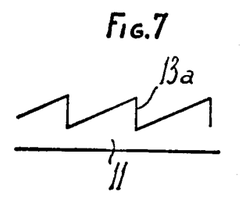
FIGS. 7 to 9 show views in elevation of different shapes which may be assumed by the rim of the disc which forms the jet or stream of material which is applied to the moving body.
Figure 10:
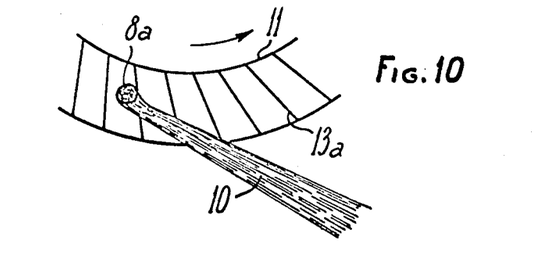
FIG. 10 is a partial plan view of a rim of the material projecting disc.

FIG. 10 shows a plan view of a part of the accelerator disc 11 containing notches and ridges 13a, of a profile corresponding to that shown in FIG. 7. Thread 10, the trace of impact of which on the disc 11 is shown at 8a, is accelerated by the combined effect of the profile of the ridges and the peripheral speed of the disc.

Figure 11:
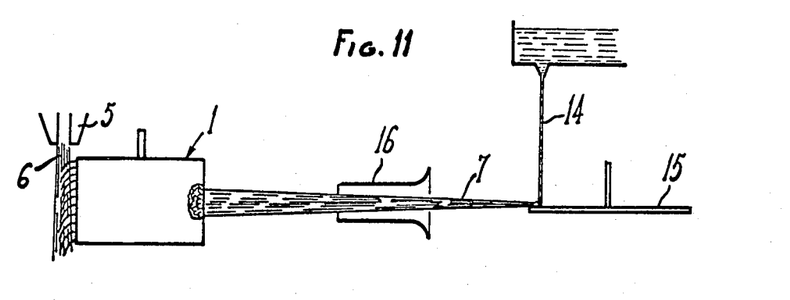
FIG. 11 is a front elevation of an apparatus for forming the jet of material.

As shown in FIG. 11, the supply of the thermoplastic material to the rotating body may also be attained by projection of a thread of the material 14 from the rim of a rotating disc 15, and the concentration or focusing of the projected thread by passage into a tuyere 16 or into a blower.

Figure 12:
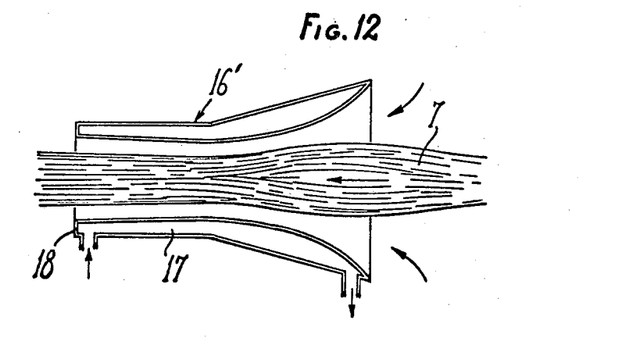
FIG. 12 shows a longitudinal sectional view of a blast pipe for directing the course of the jet of viscous material from its source of supply to the moving body.
Figure 13:
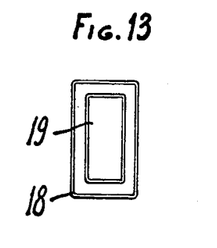
FIG. 13 is an end view of FIG. 12.

As shown in FIG. 12, a converging-diverging tuyere blast-pipe 16' with double walls may be used, and which may be cooled by the circulation of water through passage 17. The outlet end 18 of tuyere 16' may have an outline as shown in FIG. 13, which imparts to the stream 7 an impact trace on the wall of the rotating body corresponding to the outline 19 shown in this figure.

Figure 14:
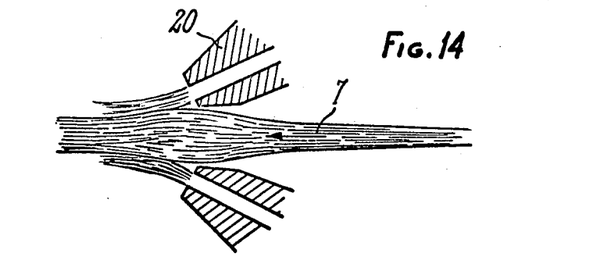
FIG. 14 is a longitudinal sectional view of a blower acting on the jet of viscous material.

In the variant embodiment shown in FIG. 14, a blower 20, concentric with the projected thread, and supplied with fluid such as air, vapor or combustion gas, is utilized. This blast pipe or blower device may be stationary and thus impart a constant direction to the jet of material directed on the wall of the rotating body. It may also be actuated with an oscillating movement to effect a sweeping of the wall of the rotating body.

Figure 15:
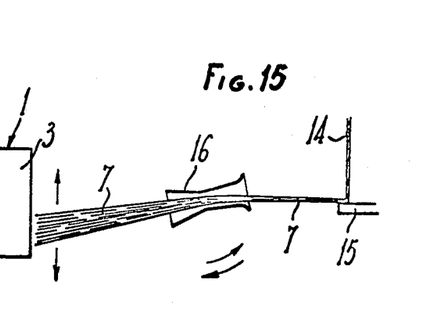
FIG. 15 is a schematic elevation of a device for controlling the jet of viscous material with an oscillating blast pipe.
Figure 16:
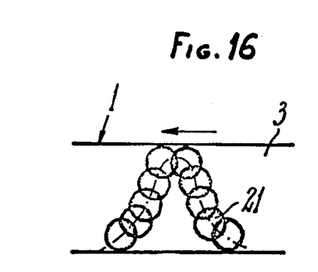
FIG. 16 is a schematic elevation showing the trajectory of the deposit formed on the wall of the rotating body.

FIG. 15 shows a pipe 16 oscillating about a horizontal axis, and FIG. 16 portrays successive tracks 21 of the jet of material on wall 3.

Figure 17:
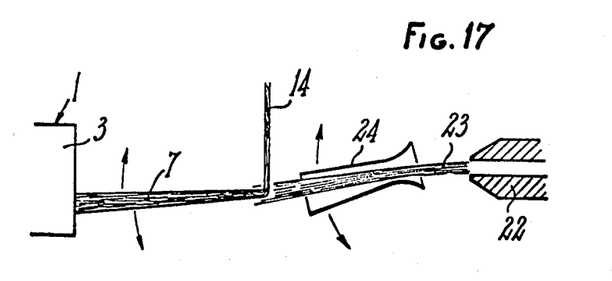
FIGS. 17 and 18 are views in elevation illustrating variant embodiments of devices for applying the jet of viscous material onto the rotating body.
Figure 18:
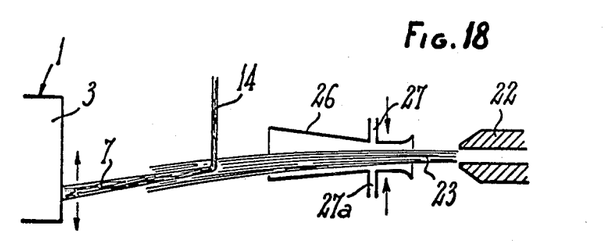

According to another variation, an oscillating movement may be imparted to the jet of motive fluid before it comes into contact with the jet of material to be fiberized. FIG. 17 shows an example of such an arrangement. A burner 22 emits a gaseous jet 23 at high speed which passes through an oscillating blast pipe 24. This jet 23 encounters the stream of thermoplastic material 14 to which it communicates a corresponding oscillating movement. In the embodiment shown in FIG. 18, the gaseous jet 23 passes through a stationary pipe 26 and its deflection is obtained by action of a fluid in passages 27, 27a at the neck of the pipe 26, which fluid is directed perpendicularly to the axis of the pipe, now in one direction, now in the other.

Figure 19:
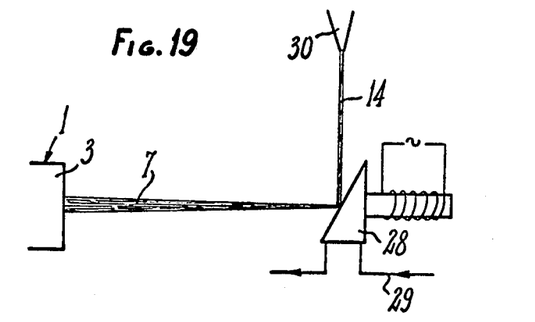
FIG. 19 is an elevation of another device for forming and controlling the jet of viscous material.

As shown in FIG. 19, the supply of material onto wall 3 of the rotating body 1 may be effected by a vibrating device. In this device, the filament of material 14 falls from a spinneret 30 onto a vibrating anvil 28, which may be cooled by a circulation of water 29 therethrough, and which projects the filament onto the wall 3. The speed of the filament reflected by the anvil, as well as the shape of the contact zone of the filament with wall 3, may be modified by regulating the frequency and amplitude of the vibrations as well as the angle $\alpha$ which the anvil forms with filament 14 dropping from the spinneret nozzle 30.

Figure 20:
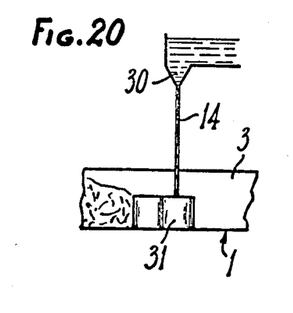
FIG. 20 is a front elevation, partially in section, of a reservoir arrangement for forming the deposit of material on the wall of the rotating body.
Figure 21:
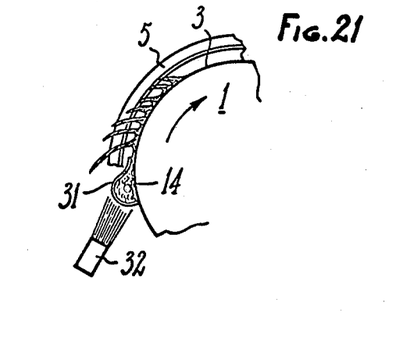
FIG. 21 is a plan view of FIG. 20.

FIGS. 20 and 21 illustrate another method of supplying the thermoplastic material to the lateral wall 3 of the rotating body. This supply is obtained by feeding the filament of material 14 issuing from spinneret 30 into a reservoir tank 31. The latter is located near wall 3 and is heated by a burner 32. The wall 3 flashes past in front of the tank which, by contact, is coated with material. The speed of rotation of the rotating body and the difference in temperature between wall 3 and the material contained in the tank, determine the thickness of the entrained layer of material.

In the preceding examples, the localization of the deposit of the material to be fiberized in a single narrow zone only, has been contemplated. From this zone, whereat is formed a reserve of material on the wall of the rotating body, filaments of material are detached by the action of centrifugal force. The quantity of material constituting each of these filaments decreases progressively in proportion to the distance from the supply zone. Beyond a certain distance there may be an interruption of the fiberizing through exhaustion of the layer of material on the wall. On the other hand, the filaments emitted immediately beyond the supply zone may have, because of their mass, an energy greater than that of the jet of fluid which serves to draw them out. Consequently, there arise great heterogeneities in the fineness of the fibers which are produced. In order to minimize these disadvantages, a plurality of jets of material, distributed uniformly around the wall, may be projected onto the lateral wall of the rotating body, by the means described above.

Figure 22:
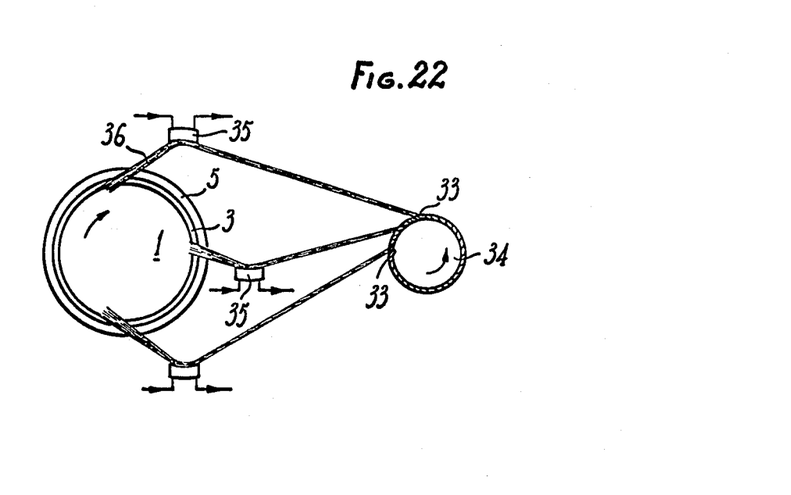
FIG. 22 is a plan view of another embodiment which permits the formation of a plurality of deposits of material at displaced portions of the rotating body.
Figure 23:
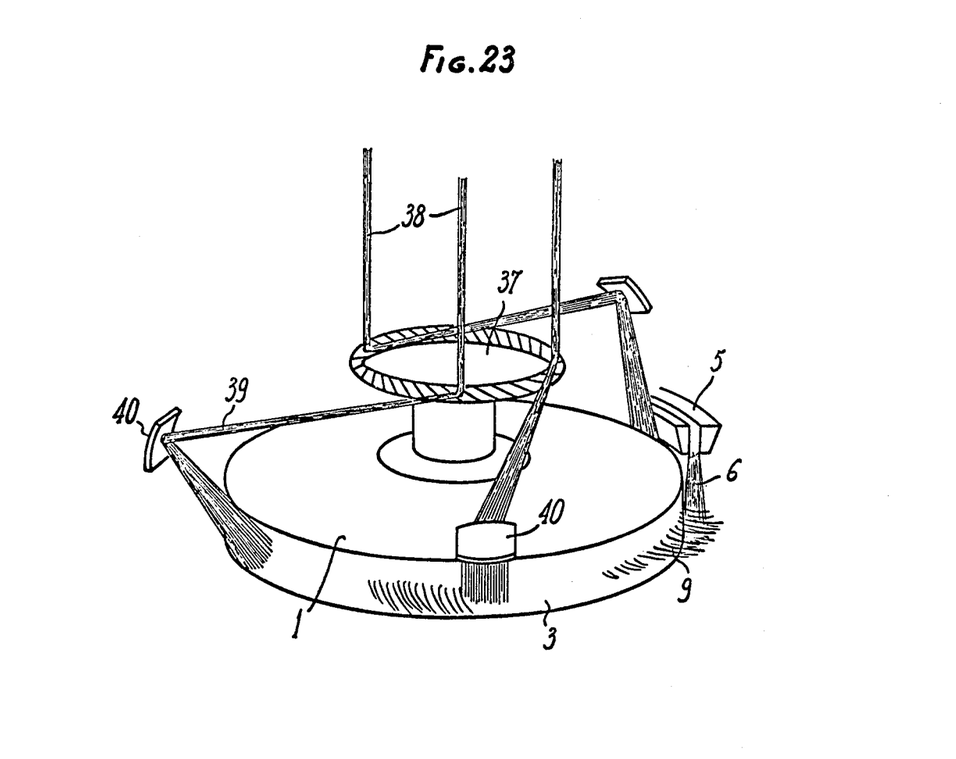
FIG. 23 is a perspective view of a variant embodiment of the device shown in FIG. 22.

In the embodiment shown in FIG. 22, filaments of material 33 from several points of an accelerator disc 34 wherefrom they are projected, come into contact with cooled deflectors 35 which direct the accelerated filaments 36 onto the wall 3 of the rotating body 1 at equidistantly displaced points. In this embodiment, the axes of the accelerator disc and the rotating body are separated. In the embodiment shown in FIG. 23, these axes are identical. Accelerator disc 37, which receives the filaments 38, is integral with the rotating body 1 and the accelerated filaments 39 are deflected by deflectors 40 arranged concentrically with respect to the axis of the assembly.

Figure 24:
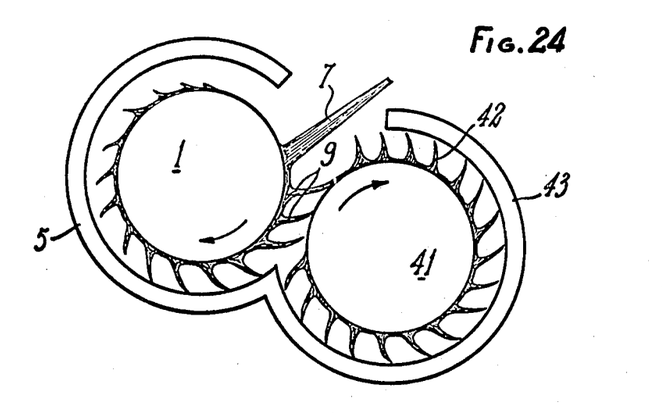
FIG. 24 is a plan view of an apparatus according to the invention comprising two rotating bodies working conjointly.

According to another arrangement, the primary filaments emitted by the rotating body onto which is formed the localized deposit of material to be fiberized, are recovered by a second rotary body. Such an arrangement is shown in FIG. 24. The first rotating body 1 receives the jet of material 7 to be fiberized, and those primary filaments 9 projected from the lateral wall of this body, which may not be drawn out effectively by the gases issuing from annular nozzle 5, are recovered by the second centrifuge body 41 rotating about an axis parallel to the axis of body 1. These filaments reconstitute a reserve supply on centrifuge 41 from which new filaments 42 are emitted, and which are effectively attenuated by the gases issuing from annular nozzle 43.

Figure 25:
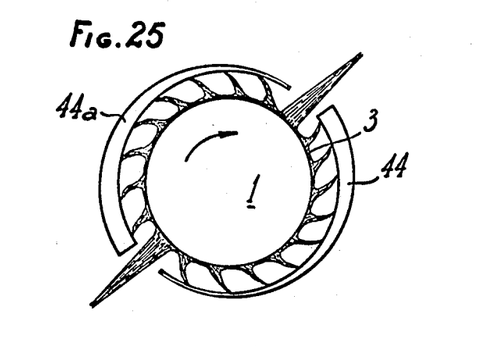
FIG. 25 is a plan view of a device with an annular blower crown having discharge slots of varying cross section.

In order to eliminate completely the effect arising from the progressive diminution of the primary filaments projected by the rotary body, and to attain an attenuation proportional to the size of the primary filaments, whereby is attained a good homogeneity of the fibers, the extent of movement of the attenuating fluids may be regulated. To this end, with the velocity of the attenuating blast being constant, it is possible to decrease the discharge of the gases in the direction of rotation of the centrifuge body beyond the zone of deposit of the material to be fiberized. FIG. 25 illustrates such an arrangement, and shows the blower nozzles 44, 44a decreasing in section from the two diametrally opposed zones of deposit in the direction of rotation of the body 1.

The annular gas ejection orifice 5 may be continuous, the accelerated filament of material being able to cross the gas jet directly from the zone of supply without being deflected. Likewise, the gas ejection orifices may be discontinuous, with interruptions of the gas jets directly at the supply zones.

Figures 26, 27:
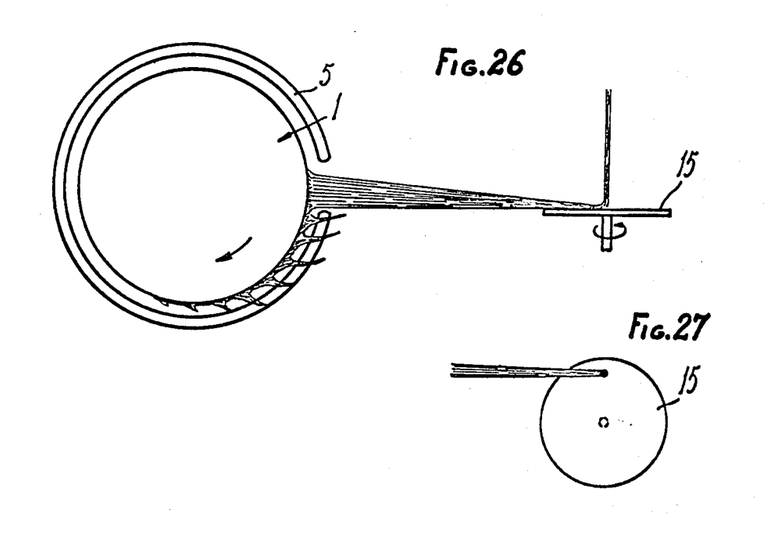
FIG. 26 is a front elevation of another embodiment of the invention.
FIG. 27 is a plan view of the accelerator disc forming part of the embodiment of the invention shown in FIG. 26.

As described above, the rotary axes of the rotating body and the accelerator disc may be the same or different. In the latter case, it is possible, as is shown in FIGS. 26 and 27, to arrange the rotary axes of the rotating body 1 and accelerator disc 15 at right angles to one another.

Figure 28:
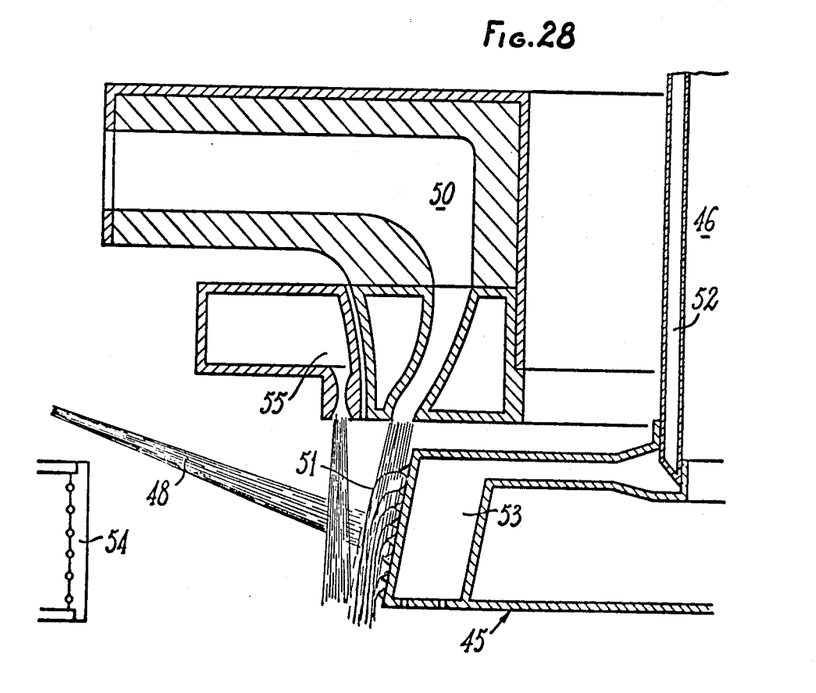
FIG. 28 is a partial vertical section of another embodiment of the invention with annular burner, vapor blower and induction heater surrounding the rapidly rotating body.
Figure 29:
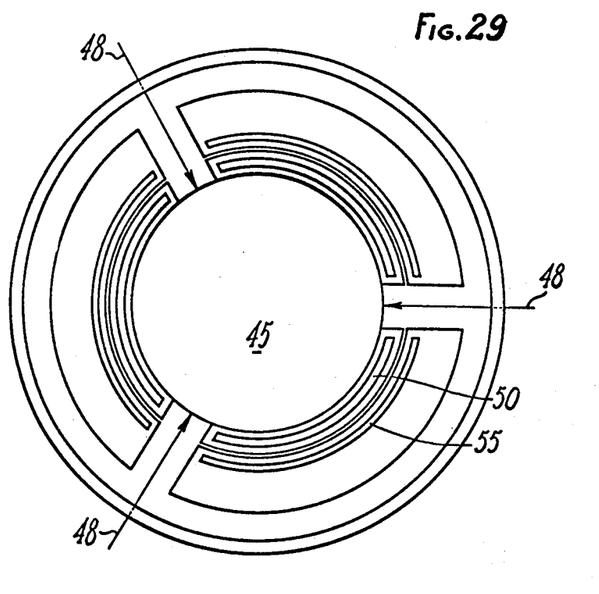
FIG. 29 is a bottom view of the main portion of the device shown in FIG. 28, on a smaller scale.

FIGS. 28 and 29 illustrate another embodiment of the invention which comprises a body 45 rotatable on a vertical axis by its shaft 46. Three jets of material 48 are projected onto its side wall by means such as those described above. The combustion gases produced by burner 50 heat the outer surface of the rotating body and maintain the material at a state of viscosity sufficiently low to allow it to be ejected in the form of filaments 51 by the action of centrifugal force while exerting a drawing out action on these filaments. The inner surface of the wall itself is cooled by means of a fluid such as air, vapor, or water which may be supplied through a conduit 52 arranged in shaft 46, and which passes into a chamber 53, one wall of which forms the inner surface of the lateral wall of the rotating body. Through the combined action of this cooling, the heating produced by the combustion gases issuing from burner 50, and also the heat generated by induction effects of a coil 54 traversed by a high frequency current, hooking or snagging points may be created which promote the localization of starting points for filaments 51, as may be seen in greater detail from the following. In this embodiment, the evacuation of the fibers is facilitated by means of a blower in the shape of parts of a ring 55.

Figure 30:
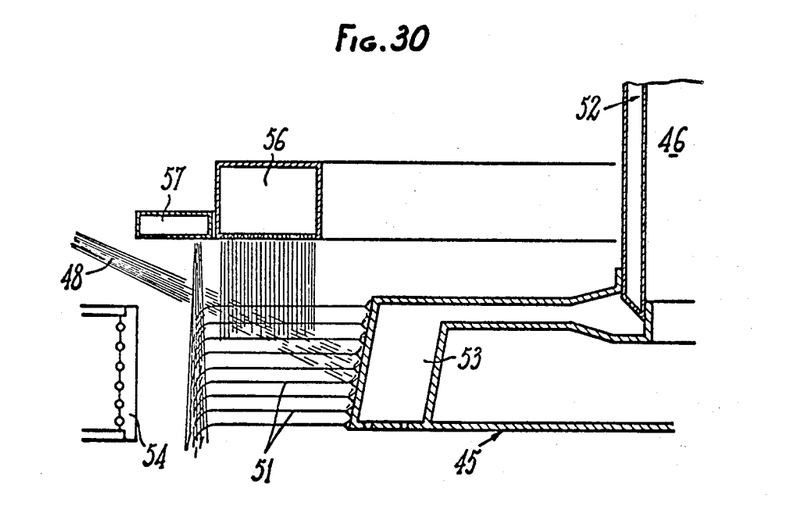
FIG. 30 is a partial vertical section of another embodiment of the invention featuring a rotating body and the mechanical attenuation of the threads or filaments.

The formation of fibers may result from the mechanical attenuation of the filaments, attained solely by centrifuging. Such an arrangement is shown in FIG. 30. However, in this case, the fineness of the fibers is greatly improved by placing a burner 56 around the rotating body, from which burner are projected feeble or weak flames or combustion gases at low velocity to maintain the filaments at the proper temperature during their attenuation. An annular blower 57 effects the removal of the fibers.

Figure 31:
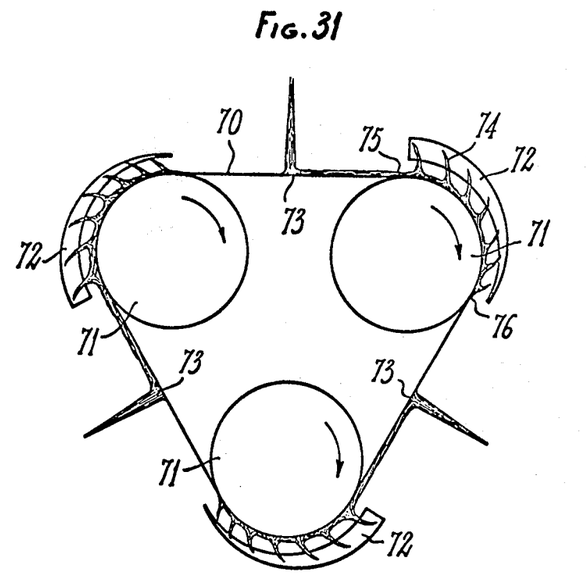
FIG. 31 is a plan view of another embodiment of the invention comprising rotating bodies which actuate a movable band onto which the viscous material is projected.
Figure 32:
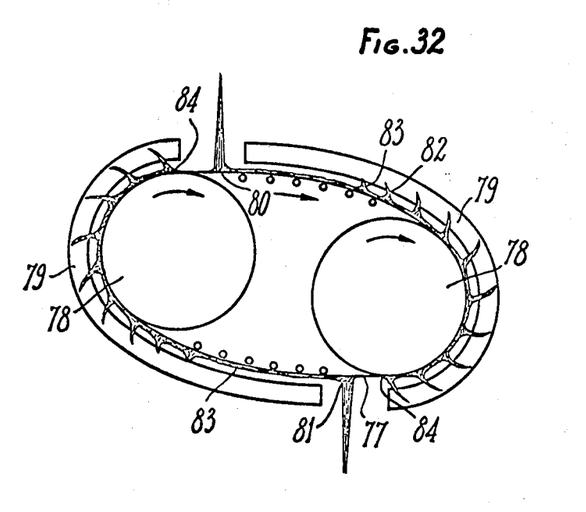
FIG. 32 is a plan view of a variant embodiment of that shown in FIG. 31.
Figure 33:
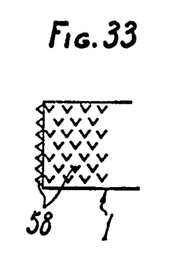
FIGS. 33 to 35 show different arrangements for providing sharp places and hooking or snagging points for priming the viscous filaments which are thrown from the lateral wall of the rotating body.
Figure 34:
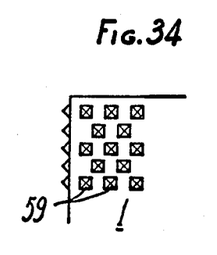
Figure 35:
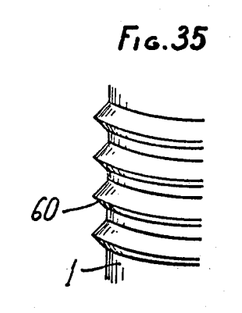
Figure 36:
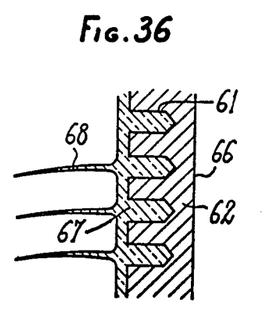
FIGS. 36 and 37 are sectional views of the moving body provided with thermal gradient points, which effect the priming of the filaments of the viscous thermoplastic material which is projected onto the heated outer surface of the moving body.
Figure 37:
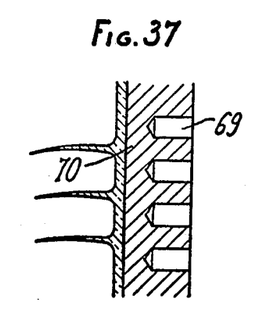

FIGS. 31 and 32 illustrate embodiments of the invention with a movable body constituted by an endless band having a path of variable curvature. The apparatus shown in FIG. 31 comprises an endless band 70 passing over three identical bodies of revolution 71 rotating at the same speed and in the same direction. Band 70 comprises roughenings, sharp projections, or snag points similar to those on the rotating bodies described above. This apparatus also comprises slots 72 through which issue blasts at high velocity. The material to be fiberized is projected or deposited on the band at points 73 where the band is straight. The projection of primary filaments 74 takes place from points 75 to points 76, where the band presents the smallest radius of curvature, along which lengths the material to be fiberized is subjected to centrifugal force.

In the variant embodiment shown in FIG. 32, the endless band 77 passes over two identical bodies of revolution 78, which rotate in the same direction and at the same speed. Gaseous blasts at high velocity issue from blower slots 79 which conform substantially to the path of the endless band. The material to be fiberized is fed to the latter at 80 and 81. The projection of primary filaments 82 begins at points 83 where the radius of curvature assumes a finite value and decreases in the direction of rotation of the band. Thus, an increasing centrifugal acceleration arises from points 83 to points 84, which makes possible the substantial uniformity of the size of the primary filaments.

In the description above, the lateral wall of the moving body is provided with roughenings or sharp or snagging points, wherefrom originate the filaments of material. However, it is necessary to note that if the material forming the layer on the lateral wall has a sufficiently low viscosity, this layer splits or bursts under the effect of centrifugal force, forming a large number of filaments. Therefore, the invention does not exclude the use of moving or rotating bodies whose lateral walls do not have such snag points. However, the number, distribution, and size of the filaments thus obtained are difficult to control. Therefore, it is advantageous to encourage the formation of filaments with the aid of well-defined snag points. The process of emission of primary filaments from the snag points is as follows: Centrifugal force acts uniformly on all elements of material located at the same distance from the axis of rotation. If the forces of cohesion of the layer of material are superior to this centrifugal force at all points, the material will not cease to adhere to the wall of the rotating body. On the other hand, by applying a sufficiently exact overheating to this layer of material, the emission of a filament at this point will be obtained. Exemplary illustrations for obtaining these points of overheating of snagging of filaments of material are set forth below.

According to one method of execution, there are provided rough places on the lateral wall of rotating body 1. These rough places may be formed by triangular points 58 (FIG. 33), diamond-shaped points 59 (FIG. 34), or ridges 60 (FIG. 35), at the edges of annular ribs.

It is also possible to obtain snag points on a smooth wall by creating hot points on this wall with the aid of discontinuities in heat conduction characteristics of this wall. FIGS. 36 and 37 illustrate such arrangements. In the embodiment shown in FIG. 36, cavities 61 are pierced in the outer surface of the lateral wall 62 of the rotating body. The depth of these cavities is less than the thickness of the wall, therefore they do not open on its inner surface 66. Because this inner surface is at a lower temperature than that of the outer surface, hot points 67 are formed in line with cavities, due to the difference in heat conduction, and the thermoplastic material spills forth from these hot points in the form of filaments 68.

In the variant embodiment shown in FIG. 37, the blind cavities 69 are provided in the internal surface of the wall, which give rise to the relatively hot points 70 on the smooth external surface of the wall between the cooler portions adjacent to the cavities. The filaments are primed from these hot points 70.

In FIG. 38 is shown a rotating body 85 in the form of a solid of revolution rotating at high velocity around a vertical axis. A jet or stream 86 of the viscous material to be fiberized is projected onto the external surface of the lateral peripheral wall 87 of this rotating body 85. This jet involves substantially the entire height of wall 87. The latter is provided with orifices 88 which constitute the priming points from which the material is projected in the form of filaments 89. The rotating body is blocked by a bottom 90 and a wall 91 arranged coaxially relative to wall 87, to define a chamber 92 which is put under pressure by means of a gaseous fluid, such as air, which is admitted thereto by a conduit 93 concentric to the axis of the rotating body. The chamber 92 may be subdivided into a plurality of blower stages along the height of wall 88.

Figure 39:
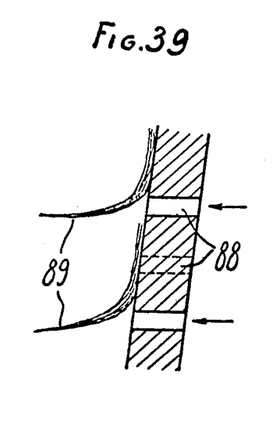
FIGS. 39 and 40 are enlarged sectional views of a portion of the peripheral wall shown in FIG. 38.
Figure 40:
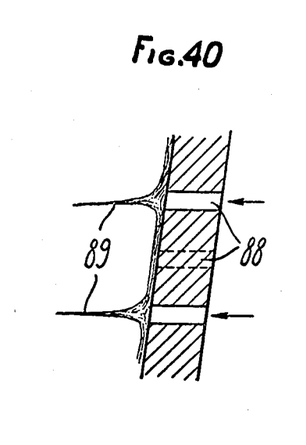

The pressure of air in chamber 92 may be such that the air passes through orifices 88 to form jets, which act on the material which is entrained by the rotating body to start the filaments 89 and to contribute to their formation as shown in FIG. 39. The air pressure in chamber 92 may also be such, that the air does not pass through orifices 88, as indicated in FIG. 40. In this case, the air pressure acting on the material opposite the orifices 88, forms priming points for the filaments emitted by the rotating body.

Figure 38:
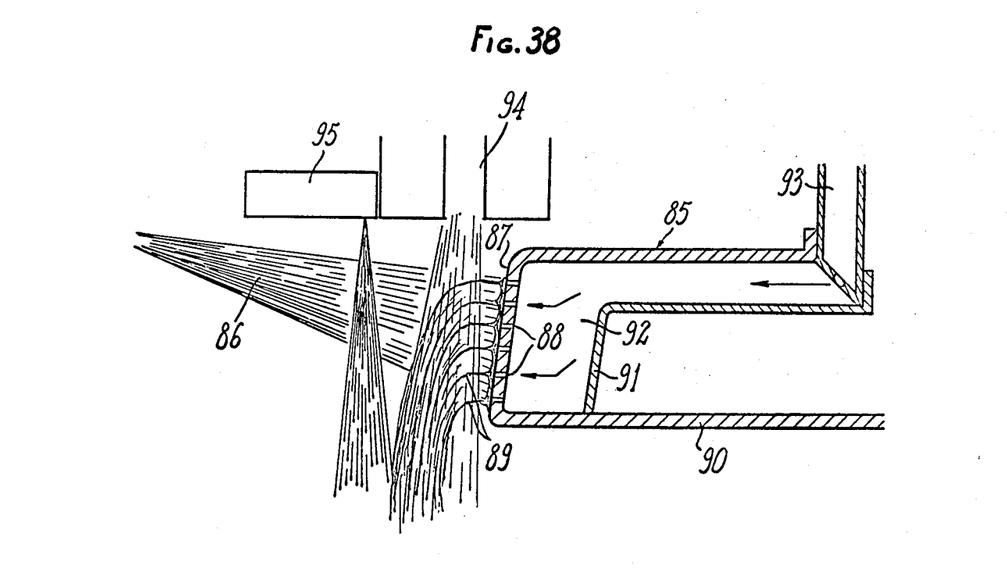
FIG. 38 is a partial sectional view of another embodiment of the invention showing the priming of the filaments on the lateral surface of a rotating body provided with orifices, through which is exerted an overpressure.

In the embodiment illustrated in FIGS. 38 to 40, the attenuation of the filaments into fibers is effected by means of a gaseous blast exhausting from the annular ejection orifice of a crown 94 arranged coaxially relative to the rotating body. There is also provided a blower crown 95, concentric to the rotating body, for the evacuation or removal of the produced fibers.

I claim:

1. The method of producing fibers from molten vitreous material which comprises
    a. projecting a supply of said material in the form of at least one continuous jet of the molten material, against a part of the external peripheral surface of a rapidly rotating body, by laterally deflecting a downwardly flowing stream of the material from its source to accelerate the velocity thereof and to convert the stream of material to a highspeed jet exceeding gravity in order to completely cover said surface with a renewable layer of said material,
    b. forming, on said peripheral surface, areas of differential physical characteristics to form priming points on said surface for a plurality of filaments of said material, said priming points causing concentrated quantities of material to initiate the projected filaments,
    c. rapidly rotating said body and thereby projecting by centrifugal force the plurality of separate filaments emanating from said priming points, and
    d. blowing an annularly shaped gaseous blast in a transverse direction against the centrifugally projected filaments to effect their attenuation into fine fibers and their evacuation from the field of centrifugal projection of the filaments.

2. The method of producing fibers from molten vitreous material which comprises
    a. projecting a supply of said material in the form of a plurality of continuous jets of the molten material, against substantially uniformly displaced portions of the external peripheral surface of a rapidly rotating body, by laterally deflecting downwardly flowing streams of the material from their source to accelerate the velocity thereof and to convert the streams of material to high-speed jets exceeding gravity in order to completely cover said surface with a renewable layer of said material,
    b. forming, on said peripheral surface, areas of differential physical characteristics to form priming points on said surface for a plurality of filaments of said material, said priming points causing concentrated quantities of material to initiate the projected filaments,
    c. rapidly rotating said body and thereby projecting by centrifugal force the plurality of separate filaments emanating from said priming points, and
    d. blowing an annularly shaped gaseous blast in a transverse direction against the centrifugally projected filaments to effect their attenuation into fine fibers and their evacuation from the field of centrifugal projection of the filaments.

3. The method set forth in claim 1, including the step of heating the centrifugally projected filaments with flames of low velocity following their projection from the priming points to enhance the attenuation effects exerted thereon.

4. An apparatus for producing fine fibers from viscous thermoplastic material, comprising
    a. a rotary body constituted by a surface of revolution rotating about a vertical axis and provided with an external peripheral surface moving at high velocity having thereon areas of differential characteristics to form priming points for filaments of said material adapted to be projected centrifugally from said surface, said priming points operating to cause concentrated quantities of the material to initiate the projected filaments,
    b. means for deflecting towards said surface a stream of said material dropping downwardly along a line displaced from said axis and imparting thereto a high velocity exceeding that caused by gravitational force, to form a high velocity jet of the viscous material in sufficient quantity to cover said surface and to maintain thereon a continuously renewable layer of said material,
    c. means for rapidly rotating said body and the layer of viscous material thereon at high velocity to effect the ejection of a plurality of filaments of said material from said layer which are initiated at said priming points, in consequence of the centrifugal force experienced thereby, and
    d. means for blowing downwardly an annularly shaped gaseous blast against the filaments projected centrifugally in horizontal planes to effect their attenuation into fine fibers and to withdraw them from the field of operation of said body.

5. An apparatus as set forth in claim 4, including means for heating said external surface comprising an annularly shaped combustion chamber with a discharge slot at the lower end thereof for delivering the heated gaseous blast onto said filaments adjacent to said surface to heat the latter and simultaneously to effect the attenuation of the filaments.

6. An apparatus for producing fine fibers from viscous thermoplastic material, comprising
    a. a rotary body constituted by a surface of revolution rotating about a vertical axis and provided with an external peripheral surface moving at high velocity having thereon areas of differential characteristics to form priming points for filaments of said material adapted to be projected centrifugally from said surface, said priming points operating to cause concentrated quantities of the material to initiate the projected filaments,
    b. means for deflecting, towards equidistantly spaced zones of impact on said surface, a plurality of streams of said material dropping downwardly along lines displaced from said axis and imparting thereto a high velocity exceeding that caused by gravitational force, to form high velocity jets of the viscous material in sufficient quantity to cover said surface and to maintain thereon a continuously renewable layer of said material,
    c. means for rapidly rotating said body and the layer of viscous material thereon at high velocity to effect the ejection of a plurality of filaments of said material from said layer which are initiated at said priming points, in consequence of the centrifugal force experienced thereby, and
    d. means for blowing downwardly an annularly shaped gaseous blast against the filaments projected centrifugally in horizontal planes to effect their attenuation into fine fibers and to withdraw them from the field of operation of said body.

7. An apparatus as set forth in claim 6, wherein said last-mentioned means comprises an annularly shaped combustion chamber above said rotary body having slots therein extending at least adjacent to the spaces between said zones of impact of said jets.

8. An apparatus as set forth in claim 6, wherein said first-mentioned means comprises a rotary disc adapted to receive the plurality of streams of said viscous material from their source, and deflecting members between said disc and rotary body to deflect them onto said external surface.

9. An apparatus as set forth in claim 8, wherein the rotary disc and rotary body are arranged coaxially, and the deflecting members are displaced circumferentially beyond the periphery of said external surface in a circle coaxial with said last-mentioned surface.

10. An apparatus as set forth in claim 4, including heating means between the external peripheral surface of said rotary body and said blowing means, for directing flames of low velocity onto the filaments projected from the priming points on said external surface to enhance the attenuation effects exerted thereon.

11. The method set forth in claim 1, including the step of oscillating the jet which is projected onto said surface to improve the distribution of the layer of material thereon.

12. The method set forth in claim 1, including the step of developing said priming points for the sources of said filaments with points of different roughness characteristics on the external peripheral surface of the body.

13. The method set forth in claim 1, including the step of developing said priming points for the sources of said filaments with points of differential heat gradients on the external peripheral surface of said body so that the filaments emanate from the hotter portions thereof.

14. The method set forth in claim 1, including the step of developing said priming points for the sources of said filaments pneumatically, by creating points of differential pressure on the external peripheral surface of the body.

15. An apparatus as set forth in claim 4, wherein said last-mentioned means comprises a combustion chamber adjacent to said rotary body having a slot therein for discharging the gaseous blast against the filaments projected from said body.

16. An apparatus as set forth in claim 15, wherein said slot is discontinuous at least at the point where said jet of viscous material strikes the external surface of said rotary body, and is of decreasing cross section from the zone of impact on said body in the direction of rotation thereof.

17. An apparatus as set forth in claim 4, wherein said first-mentioned means comprises a rotary disc operating in a substantially horizontal plane for deflecting the dropping stream of said viscous material in a lateral direction onto said external surface.

18. An apparatus as set forth in claim 17, including pneumatic means between said disc and the external surface of said rotary body for controlling the force and zone of impact of said jet on said external surface.

19. An apparatus as set forth in claim 4, including means for forming said priming points, comprising a plurality of perforations in said peripheral surface, a chamber in said rotary body adjacent to the interior of said, and means for blowing a gas under pressure from said chamber through said perforations against the inner surface of said layer of viscous material to start the filaments at said perforations.

20. An apparatus as set forth in claim 19, wherein said chamber constitutes only a small portion of the volume of said rotary body.

21. An apparatus as set forth in claim 20, wherein said peripheral surface is of substantial height, and said blowing means is adapted to affect the perforations along the entire height of the peripheral surface.

22. An apparatus as set forth in claim 17, wherein said rotating disc is provided with a rim of saw tooth cross section.

23. An apparatus as set forth in claim 17, wherein said rotating disc is provided with a rim of an undulating wave or sine-wave cross section.

24. An apparatus as set forth in claim 17, wherein said rotating disc is provided with a rim of successively stepped cross section.

25. An apparatus as set forth in claim 18, wherein said pneumatic means comprises a tuyere or blower.

26. An apparatus as set forth in claim 18, wherein said pneumatic means comprises an oscillating tuyere for varying the level of the zone of impact on said external surface of said lateral wall.

27. An apparatus as set forth in claim 4, wherein said means for deflecting said viscous material with great force comprises a blower jet adapted to be directed against stream of said viscous material dropping from its source, and means for controlling said blower jet to vary the direction and force of the jet of viscous material directed against said external surface.

28. An apparatus as set forth in claim 27, wherein said controlling means comprises a tuyere through which said blower jet passes, and means for rocking said tuyere.

29. An apparatus as set forth in claim 27, wherein said controlling means comprises a tuyere through which said blower jet passes, and pneumatic means communicating with the interior of said tuyere for actuating said blower jet alternately in an upward and downward direction along an axis perpendicular to that of the tuyere.

* * * * *

UNITED STATES PATENT OFFICE
CERTIFICATE OF CORRECTION

Patent No. 3,649,232               Dated     March 14, 1972

Inventor(s)    JEAN BATTIGELLI

It is certified that error appears in the above-identified patent and that said Letters Patent are hereby corrected as shown below:

In claim 19, column 10, line 5, after "said" insert --surface--.

In claim 27, column 10, line 32, before "stream" insert --the--.

Signed and sealed this 7th day of November 1972.

(SEAL)
Attest:

EDWARD M. FLETCHER, JR.                ROBERT GOTTSCHALK
Attesting Officer                      Commissioner of Patents